UNITED STATES PATENT OFFICE.

ZENSHIRO SUZUKI, OF LOS ANGELES, CALIFORNIA.

PROCESS FOR THE PRODUCTION OF A DYESTUFF.

1,244,795.

Specification of Letters Patent. Patented Oct. 30, 1917.

No Drawing. Application filed October 30, 1916. Serial No. 128,643.

*To all whom it may concern:*

Be it known that I, ZENSHIRO SUZUKI, a subject of the Emperor of Japan, residing at Los Angeles, in the county of Los Angeles and State of California, have invented a new and useful Process for the Production of a Dyestuff, of which the following is a specification.

My invention relates to the process of the production of dye-stuff, the main object of the invention being to provide an inexpensive process of producing a dye-stuff of a dark brown color, utilizing rice hulls, which were left as waste formerly.

In carrying out my invention I first take rice hulls, add suitable caustic alkali to the hulls, and then boil the hulls and caustic alkali together until the hulls are dissolved.

In order to sulfurize said dissolved substance, I add a quantity of sodium sulfid and sulfur, and continue to boil, stirring up constantly, until my new sulfid dye-stuff is produced.

The following is an illustration as to the carrying out of my invention:

I preferably take one pound of rice hulls, six ounces of caustic soda and ¼ gallon of water, and boil together about one hour, until a thick alkali liquid of an organic chemical nature is obtained. To said alkali liquid I next add one pound of sodium sulfid and ten ounces of sulfur, and continue boiling, stirring the mixture well all the while. At first a vapor arises; sulfureted hydrogen gas following it, and there is left a strong viscous lump or mass in the boiler. I continue to heat and stir the mass until the heat is raised to the temperature of about from 150 C. to 180 C., and will by this reduce the mass to a dry mass, which may be reduced to a powder and is a new and useful dye-stuff.

In order to get a different degree of color I may add at the beginning of the process to said rice hulls, either rice bran, wheat bran, millet bran or buck-wheat hulls, and then through the same steps as described above such desired purpose will be accomplished.

The dye-stuff I have obtained is to be used for dyeing cotton yarns and cotton goods as ordinary dye-stuff is used.

What I claim and desire to secure by Letters Patent of the United States is:

1. The process of making a sulfur-containing dye consisting essentially in heating rice hulls with water and caustic alkali, adding sulfur and sodium sulfid and continuing the heating until sulfureted hydrogen has been evolved.

2. The process of making a sulfur containing dye consisting essentially in heating rice hulls with water and caustic alkali, adding sulfur and sodium sulfid and continuing the heating until a dry mass is obtained.

ZENSHIRO SUZUKI.